ial. 91356; **Richard
W. Foster,** 1845 Niodrara Drive,
Glendale, Calif. 91205

[22] Filed: Jan. 17, 1975

[21] Appl. No.: 541,707

[52] U.S. Cl. ............................ 179/2 A; 340/149 R;
                                                340/274 C
[51] Int. Cl.² .................... H04M 11/00; H04G 3/00
[58] Field of Search ......... 179/2 A, 1 MN; 340/150,
            340/151, 149 R, 274 R, 274 C, 149 A;
                                                346/144

[56]            References Cited
           UNITED STATES PATENTS

| | | | |
|---|---|---|---|
| 3,187,334 | 6/1965 | Humphrey | 179/2 A |
| 3,378,831 | 4/1968 | Metcalf | 340/149 R |
| 3,500,326 | 3/1970 | Benford | 340/147 |
| 3,790,957 | 2/1974 | Dukes et al. | 340/149 R |
| 3,825,898 | 7/1974 | Miller | 340/149 R |
| 3,829,833 | 8/1974 | Freeny | 340/149 R |

*Primary Examiner*—Kathleen H. Claffy
*Assistant Examiner*—Randall P. Myers
*Attorney, Agent, or Firm*—Robert E. Geauque

[57]           ABSTRACT

A system for providing a record of each time any one of a plurality of remotely located locking devices is operated, as well as the number of the key used for each lock actuation. The disclosed system includes means located at each secured premises for sensing the actuation of the lock and the number of the actuation key; means for automatically telephoning to a central office the key number as well as a code which identifies the reporting facility; and means at the central office for recording this data and its time of receipt, and for providing a printout thereof.

14 Claims, 10 Drawing Figures

SYSTEM FOR RECORDING THE ACTUATION OF REMOTELY LOCATED LOCKING DEVICES

BACKGROUND OF THE INVENTION

This invention relates generally to systems for recording the actuation of locking devices and particularly to such systems adapted for providing this information with respect to locks at a plurality of remotely located facilities.

One method which has been employed to increase the security of certain facilities, such as stores for example, has been the use of systems for recording each actuation of the door locks, the time of such actuation and the number of the actuating key. Such systems have typically comprised means for recording this information on tape and weekly the tape must be picked up by the servicing Security Company and transported to their central office where it is decoded and a report of "openings and closings" prepared. Although this current method of reporting had added substantially to monitoring activities at the protected premises, the aspect of such systems which requires weekly pickups and remote processing of the record tapes contributes a substantial amount to the cost of the service and to the time required for the customer to obtain a report on the "openings and closing" activities at his facilities.

SUMMARY OF THE INVENTION

The above-described disadvantages as to the cost and delay associated with the pickup of the record tapes are avoided by the subject invention which includes a subsystem at each protected facility for sensing the actuation of the lock and the number of the actuating key, and for automatically transmitting to a central office by means of the telephone network the key number as well as a code which identifies the particular reporting facility. A subsystem at the central office records the received data and its time of receipt and provides a printout thereof. The subsystem at the protected facility includes means for automatically dialing the telephone number of the central location and upon receipt of an authorizing signal therefrom continues to transmit the key number and location data until a "validity of reception" signal is received. Upon receipt of this "validity" signal, the sending subsystem releases the telephone line and returns to a standby mode in readiness for the next actuation of a lock at its facility. The subsystem at the central office includes means for providing the "validity of reception" signal only after successive transmissions of identical data have been received. In accordance with one preferred embodiment of the invention a TELETYPE printer is employed to provide a "real time" printout of received data which includes its time of receipt, the identity number of the reporting facility and the number of the actuating key. This same data is also recorded by means of a TELETYPE reperforator on punched type. The TELETYPE printout allows personnel at the central office to immediately identify certain suspicious activities, such as the opening of a store outside of its normal business hours. The punched reperforator tape allows for the economical preparation of printed reports for each of the protected facilities. Such a report can be prepared by a computer service bureau by means of a conventional "batching" program and might list in chronological order for each protected facility the key number, date, hour and minute of each lock actuation.

The subject invention includes a new and novel lock cylinder which provides electrical signals indicative of the number of the actuating key. The cylinder is readily interchangeable with existing type lock cylinders and is adaptable for use with what appears to be standard type keys.

Another advantage of the subject invention is that the time required for the transmission of data from the protected facility to the central office is extremely short so that a great many subscribers may be serviced by a single telephone line at the central office; and a single "receiving WATS" service at the central office allows coverage of an extended geographical area without toll charges. In accordance with the invention, storage is provided in the subsystem at the protected facilities to take care of situations involving near simultaneous reports, ie if a using subsystem encounters a busy line at the central office it continues to dial until the connection is completed and the stored data is transmitted. Buffer data storage is provided in the receiving equipment at the central office to cover situations where data is received at a rate in excess of the capabilities of the TELETYPE printed and reperforator.

It is therefore an object of the invention to provide a novel and improved system for recording the actuation of locking devices.

Another object is to provide an improved, cost effective system for recording the actuation of locking devices at a plurality of diversely located facilities by the automatic telephone reporting of such actuations to a central data recording office.

A further object is to provide an improved system for recording the actuation of locking devices and which incorporates a new and novel lock cylinder for providing electrical signals indicative of the number of the actuating key and which is adaptable for being operated by what appears to be standard type keys.

BRIEF DESCRIPTION OF THE DRAWINGS

The novel features of the invention, as well as the invention itself, will be better understood from the accompanying description taken in conjunction with the accompanying drawings in which like reference characters refer to like parts and in which.

DESCRIPTION OF THE PREFERRED EMBODIMENT

Figure 1:
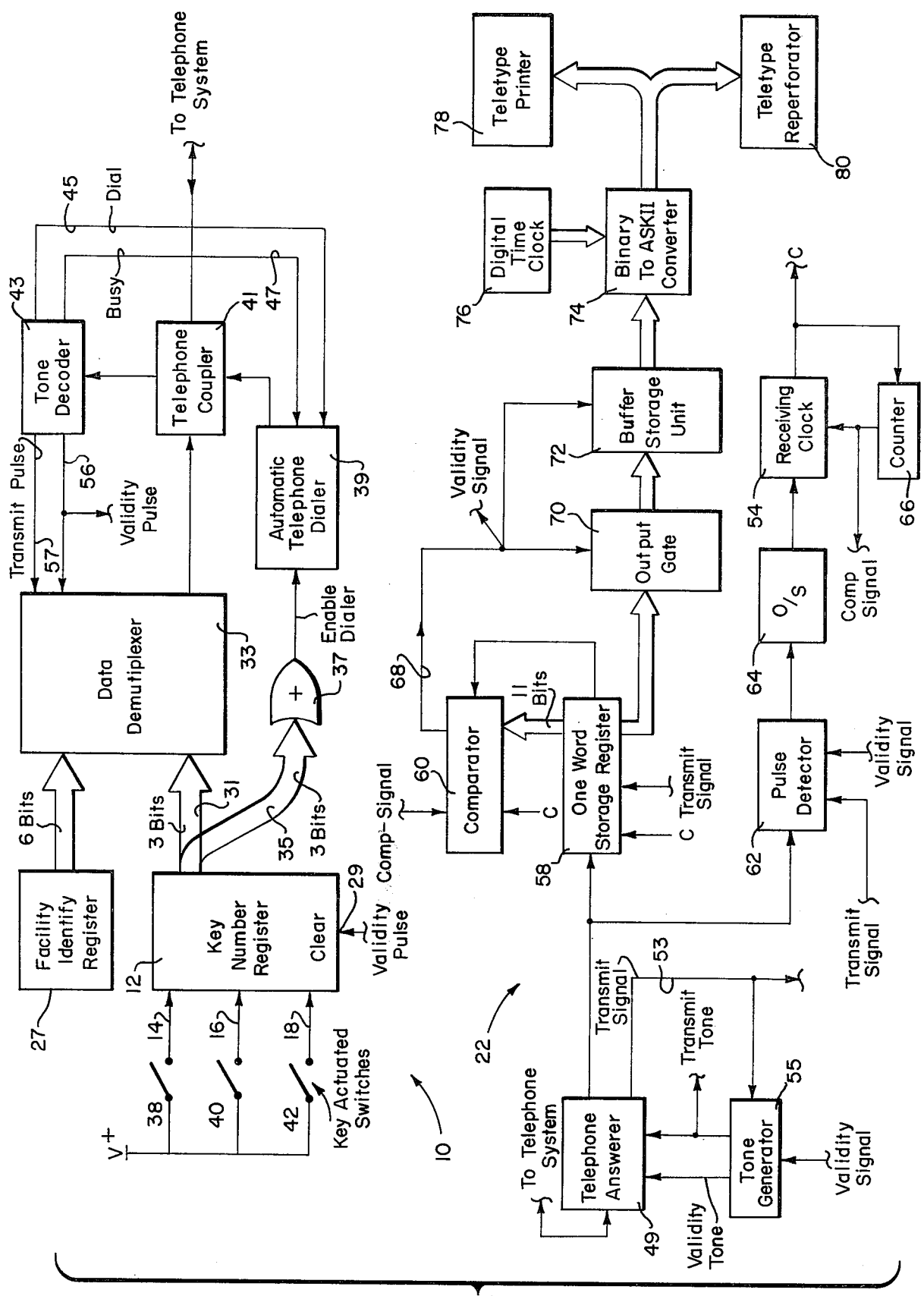
FIG. 1 is a block and schematic diagram of one preferred embodiment of a system for recording the actuation of remotely located locking devices in accordance with the invention.
Figure 2:
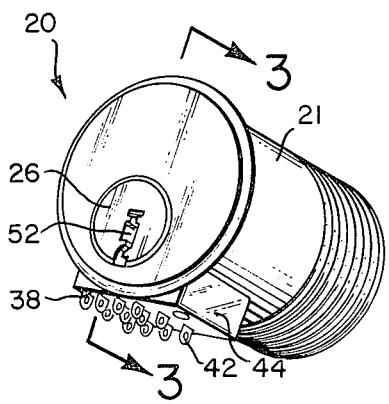
FIG. 2 is a perspective view of a lock cylinder suitable for use with the system of FIG. 1.
Figure 3:
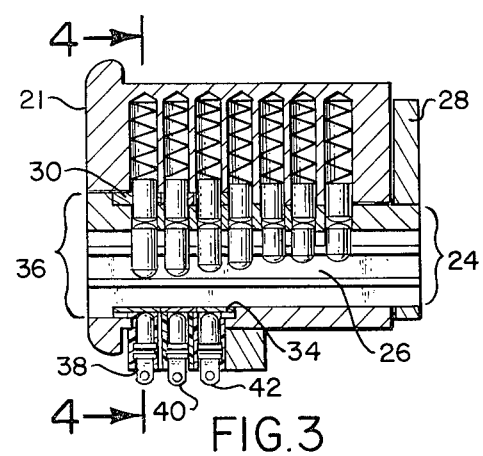
FIG. 3 is a sectional view taken along line 3—3 of FIG. 2.

In FIG. 1 subsystem 10, which is installed at each of the protected facilities, is shown in the top half of the figure. A key number register 12 receives an input signal on one or more of three input leads 14, 16 and 18, each time the associated locking device 20 (see FIGS. 2–9) is actuated. Although only one subsystem 10 is shown in FIG. 1, it should be understood that in practice there may be a plurality of such subsystems at a given facility and a great many facilities are serviced by the receiving subsystem 22 shown in the bottom half of the figure.

Before proceeding with the description of subsystems 10 and 22, locking device 20 will be described with reference primarily directed to FIGS. 2–9. Locking device 20 may be constructed from a standard seven pin lock cylinder, for example, which has a cylinder body 21, in which is provided an opening 24 adapted to receive a plug 26. A cam 28 is mounted at the rear of plug 26 and is adapted for operating the door lock mechanism (not shown). Cylinder 21 is counter bored as deep as the first three pin positions. For example, if the diameter of opening 24 is normally one-half inch, it might be counter bored to five-eighth inch. Three sleeves or rings 30, 32 and 34 are adapted for being disposed in counter bored section 36, and each sleeve has an opening in the top portion thereof and a "flat" on its lower surface. Each sleeve has an outer diameter slightly less than the inner diameter of counter bored section 36 and an inner diameter slightly greater than the diameter of plug 26.

Three microswitches 38, 40 and 42 are mounted by means of holder 44 on the outside bottom portion of cylinder 21. Switches 38, 40 and 42 each have an actuation plunger or arm 46, 48 and 50, respectively (see FIG. 8). The bottom portion 51 (see FIG. 7) of cylinder 21 is machined away such that the switch plungers 46, 48 and 50 are contiguous to sleeves 30, 32 and 34, respectively.

Figure 5:
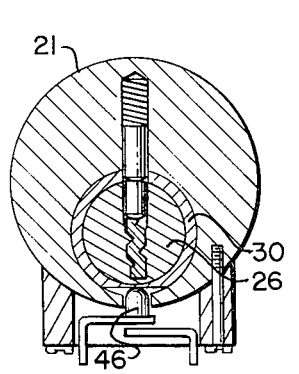
FIG. 5 is a transverse cross-sectional view of the lock cylinder of FIG. 2 in which a key positions the tumblers so as to form a "shear line" between the plug and the sleeve.
Figure 6:
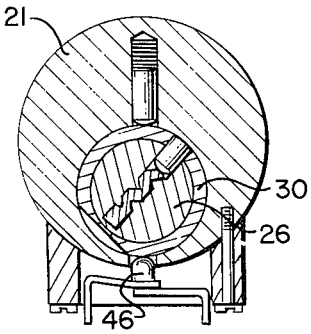
FIG. 6 is a transverse cross-sectional view of the lock cylinder of FIG. 2 in which the key positions the tumblers so as to form a "shear line" between the sleeve and the cylinder.
Figure 7:
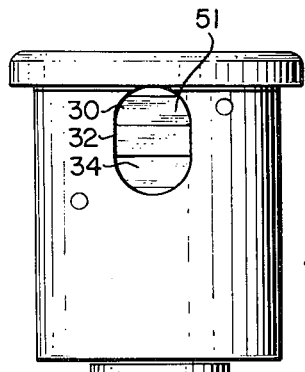
FIG. 7 is a bottom plan view of the lock cylinder of FIG. 1 with the microswitches removed.
Figure 8:
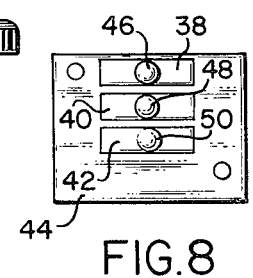
FIG. 8 is a bottom plan view of the microswitches and holder.
Figure 9:
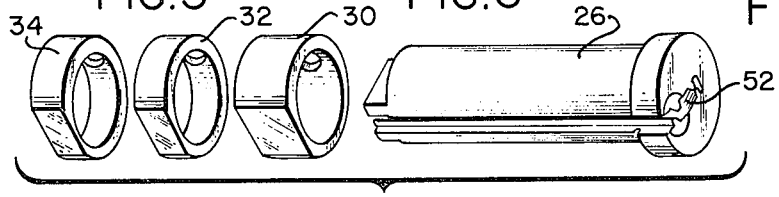
FIG. 9 is a perspective view of the plug and sleeve elements of the lock cylinder of FIG. 2.

In the aligned (locked) position of keyway 52 of plug 26, the pins extend into the plug, with the pins of the first three positons passing through sleeves 30, 32 and 34. It is noted that there are two "shear" lines associated with the first three pin positions; one at the interface of plug 26 and the sleeves, and another at the surface of the sleeves and cylinder 21. The pins in the first three positions and the corresponding cuts in the key are selected such that operation at selected ones of the two "shear" lines are implemented. For example, FIG. 5 shows a "pin and key cut" configuration whereby the "shear" line is between the plug and the sleeve; and therefore as the plug is rotated the sleeve is held stationary by the pin. FIG. 6 shows a "key cut" configuration whereby the same pin length as shown in FIG. 5 is now raised to where the "shear" line is between the sleeve and the cylinder and therefore the sleeve rotates with the plug.

Figure 4:
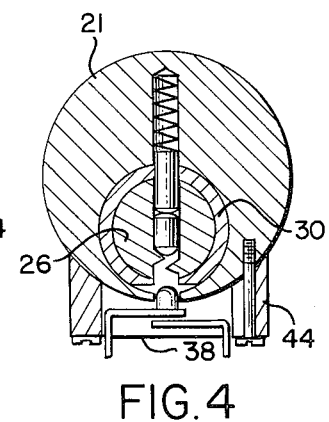
FIG. 4 is a sectional view taken along line 4—4 of FIG. 3.

When a sleeve is aligned in the position illustrated in FIGs. 4 and 5, the flat portion of the sleeve provides clearance for the plunger of the associated microswitch and the switch is "open". When a sleeve is rotated such as shown in FIG. 6, the plunger of the associated microswitch is depressed and the switch is closed. Each key is cut such that a different combination of switch closures is implemented and as will be explained subsequently the number and positions of the closed switches are used to provide a binary number which is indicative of the particular key being used. For example, a key assigned number one would be identified by the closure of only the first switch 38, ie binary number 001; key number two would be identified by the closure of only the second switch 40, ie binary number 010; and key number seven by closure of all three switches, ie binary number 111. It is noted that when a sleeve is rotated the associated switch will be closed during the major portion of the locking or unlocking operation, with the open and closed time intervals being a function of the size of the flat segment of the sleeves relative to the rounded portion thereof.

The locking device of the subject invention has several advantages not found in prior such devices. For example, the key has substantially the same appearance as any ordinary key, whereby the fact that use of the key is being recorded is not obvious. Also, locking device 20 is derived from a standard cylinder in such a manner that all modifications are at the front portion of the cylinder. Hence, locking device 20 may be installed by merely screwing it into an existing lock mechanism without modifying the lock mechanism itself. A cover or escutcheon may be installed over the additional front portion of cylinder 21; and since such covers are used to prevent "attacks" on other types of lock cylinders, ie to prohibit twisting the cylinder out by means of pliers or the like, the addition of the cover does not necessarily indicate that the use of the key is being recorded.

Returning now to the description of subsystem 10 shown in FIG. 1, if one or more of switches 38, 40 and 42 are closed a high or true signal is stored in key number register 12. In the illustrated embodiment, register 12 comprises three flip-flop circuits (not shown) which are set if their respective inputs are true and which are reset by a "clear" signal applied to terminal 29. The output signal from the "Q" terminal (not shown) of each of the flip-flops of register 12 is applied in parallel by means of cable 31 to a data demultiplexer 33 and by means of a cable 35 to an OR gate 37.

In response to any one of the inputs to key number register 12 "going high" OR gate 37 enables an automatic telephone dialer 39. Dialer 39 is coupled to a telephone coupler 41 and in response to an enable signal from OR gate 37 the dialer seizes the telephone line. Upon receipt of a dial tone on the line, tone decoder 43 applies a signal indicative thereof to dialer 39 on a lead 45 and in response thereto the preprogrammed telephone number of the central office is dailed by unit 39. If the telephone at the central office is busy, the busy signal is detected by tone decoder 43 and a signal indicative thereof is applied to dialer 39 on a lead 47 and in response thereto dialer 39 is reset to again dial the central office.

The subsystem in the central office is illustrated in the bottom half of FIG. 1, and includes a telephone answerer 49 which indicates the receipt of an incoming call by applying a signal on a lead 53 to a tone generator 55. In response thereto, tone generator 55 sends a "transmit authorizing" tone through answerer 49 and telephone coupler 41 to tone decoder 43. Unit 43 responds to this tone and provides a transmit pulse on a lead 57 to data demultiplexer 33. This transmit pulse enables unit 33 which responds by serially scanning the outputs of facility register 27 and key number register 12.

Register 27 might comprise a first output terminal wired to a voltage source which is indicative of the binary one state and five switches arranged such that the output of each switch may be set to either binary one or binary zero state. As will be explained subsequently, the first output bit (sync pulse) from register 27 is used to synchronize the receiving clock 54 of subsystem 22. The remaining five bits provided by register 27 represent the identity number of the reporting facility.

Figure 10:
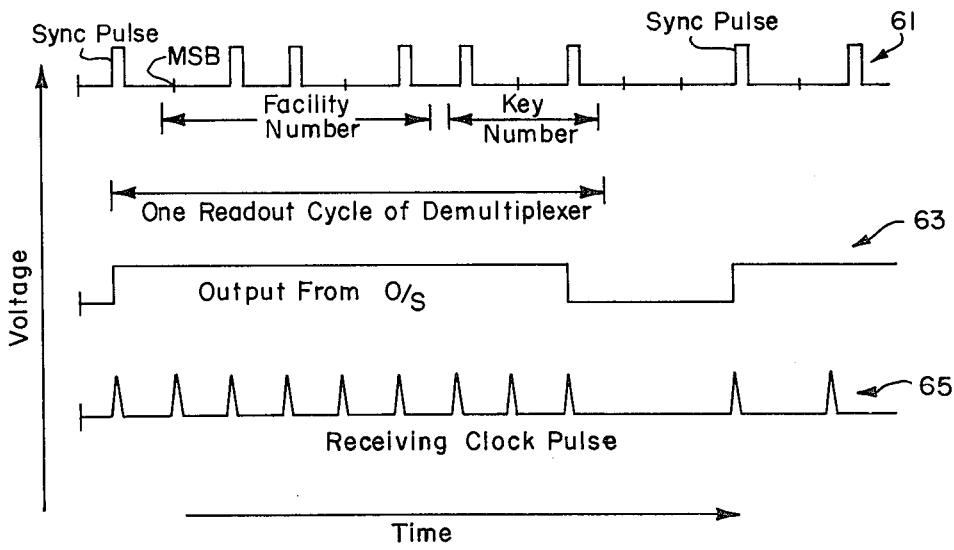
FIG. 10 depicts waveforms of electrical signals which are useful for explaining the operation of the system of FIG. 1.

Following the serial readout of register 27 data demultiplexer 33 serially reads out the contents of register 12. As discussed above, the output bits from register 12 are indicative of the number of the key which actuated the lock. The output signal format of demultiplexer 33 is illustrated in waveform 61 of FIG. 10; and such readout cycles are sequentially repeated until the demultiplexer is disabled by the application thereto of a validity pulse on a lead 56.

The output signals from demultiplexer 33 are applied through coupler 41, the central telephone system, and answerer 49 to a one word storage register 58. This data is also applied in parallel to a pulse detector 62.

Pulse detector 62 is enabled by the transmit signal applied from lead 53 of answerer 49 and operates to detect the sync pulse, eg the first pulse received after the application of the transmit signal. In response to the detection of the leading edge of the sync pulse, unit 62 provides an output signal which triggers a one shot (O/S) 64. The leading edge of the output pulse (see waveform 63 of FIG. 10) from O/S 64 synchronizes receiving clock generator 54 whose output clock pulses are at substantially the same rate as the self clocking readout circuits (not shown) of demultiplexer 33. After twelve clock pulses (see waveform 65 of FIG. 10), counter 66 resets clock 54 and inhibits further output clock pulses until retriggered by O/S 64 during the following data reception cycle. The output clock pulses, designated "C", are applied to units 58 and 60 so as to synchronize their operations.

In response to these clock pulses, the received data is shifted into register 58 and the output of register 58 is shifted into a comparator 60. Register 58 is cleared at the start of each facility reporting operation by the application of the transmit signal from lead 53. On the trailing edge of the twelfth clock pulse, counter 66 provides a "comp" signal and in response thereto the corresponding bits held in register 58 and comparator 60 are compared and if a match is detected a validity signal is applied on an output lead 68.

In the operation of the just described circuitry during the first data reception cycle, the received information is loaded into register 58 and its contents, which are all zeros due to the register being cleared, are shifted into comparator 60. On the second readout of demultiplexer 33 the received data is again shifted into register 58 and the data from the first transmission is shifted into comparator 60. If no errors such as due to line noise, for example, occurred in the transmission of the data, a match is detected between the first and second sets of data and a validity signal is produced. If for any reason the data does not agree, the system continues the above-described cycles of operation until validity is confirmed.

The validity signal is applied to tone generator 55 which in response thereto produces a tone which is transmitted to tone decoder 43. In response to the validity tone, decoder 43 produces a validity pulse which "disables" demultiplexer 33 and which clears key number register 12. When register 12 is cleared the output from OR gate 37 goes low and thereby disables dialer 39 which releases the telephone line. Hence, transmitting subsystem 10 at the protected facility is returned to the standby mode in readiness for the next actuation of its associated locking device.

The validity signal from comparator 60 is also applied to pulse detector 62 which is disabled in response thereto. Output gate 70 and buffer storage unit 72 are enabled by the validity signal and in response thereto the contents of storage register 58 are shifted in parallel into buffer storage unit 72.

Binary to ASKII converter unit 74 converts the data from buffer storage 72 as well as the time data from a digital time clock 76 into the format compatable with TELETYPE printer 78 and and reperforator 80. The first six bits of data from buffer 72 identify the facility number; for example, a code of 101101 would correspond to facility 1+0+4+8+0 or 13. It will be recalled that the first bit in the facility number is a sync pulse and hence is not used in the identification. The next three bits of the data from buffer 72 identifies the actuating key according to the position of the "one" bit. For example, a code of 101101 011 would be converted as 13, 3, ie facility 13 and key 3. Logic circuits for making the above-described conversions are well known in the art and hence need not be described in greater detail herein. Also, circuits for converting this information into the ASKII TELETYPE machine language are well known.

After the above operations and the encoding of the output of digital time clock 76, the printout on teletype printed 78 might be 13 3 5 4 23 40 to signify that the lock at facility 13 was actuated by key numbered 3 on May the 4th at 2340 hours (40 minutes after 11 P.M.) The same information is stored on punched tape by reperforator 80. It is noted that there will be a few seconds discrepancy between the time of actuation of the lock and the encoding of the output from digital clock 76; however, this factor has no practical disadvantages in the use of the subject invention.

Buffer storage unit 72 insures that data is not lost should the reporting rate exceed the rate of the printout units and allows converter 74 to operate at a processing rate compatable with the printout equipment and independent of the rest of the system. It is further noted that the mechanization of subsystem 10 guards against loss of data if receiving subsystem 22 is occupied by a report from another facility. This results from the features whereby subsystem 10 continues to call the number of the central office until an "OK" to transmit signal is received and then subsystem 10 continues to send the report until validation of the reception of the data is received.

The punched reperforator tape allows for the economical preparation of printed reports for each of the protected facilities. Such a report can be prepared by a computer service bureau by means of a conventional "batching" program and might list in chronological order for each facility the key number, date, hour and minute of each lock actuation.

Hence, having disclosed an improved, cost effective system for recording the actuation of locking devices at a plurality of diversely located facilities by the automatic telephone reporting of such actuations to a central data recording office, what is claimed is:

1. A system for providing a record at a central office of the actuation of at least one remotely located locking device and the identification of the actuating key, said system comprising:

lock monitoring means, disposed at a remote location, for sensing each actuation of an associated locking device and for providing key identifying binary signals indicative of the identification of the actuating key, said lock monitoring means including a key type lock cylinder and plug arrangement adapted for interconnecting with said locking device in a conventional manner, a plurality of cylindrical sleeves disposed between said plug and cylinder such that depending upon the configuration of the cylinder pins and the actuating key preselected ones of said sleeves rotate with said plug, and switch means for sensing the rotation of said sleeves and for providing binary signals indicative thereof;

first means, located at the remote location and responsive to said key identifying binary signals, for automatically transmitting to the central office facility identifying binary signals indicative of the facility at which the actuated lock is located and for automatically transmitting the key identifying binary signals to the central office; and second means located at the central office for receiving said key and facility identifying signals and for providing a record thereof.

2. The system of claim 1 wherein said second means includes means for also recording the time and date of the reception of said key and facility identifying signals.

3. The system of claim 2 wherein said first means includes telephone dialing means responsive to said key identifying binary signals for automatically dialing the telephone number of the central office; and data transmission means for transmitting said key and facility identifying binary signals to the central office by means of the telephone network.

4. The system of claim 2 wherein said second means includes means for converting said received facility and key identifying binary signals and said time and data data into ASKII coded data; and a TELETYPE printer coupled to receive said ASKII coded data.

5. The system of claim 2 wherein said second means includes means for converting said received facility and key identifying binary signals and said time and data data into ASKII coded data; and a TELETYPE reperforator coupled to receive said ASKII coded data.

6. A system for providing a record at a central office of the actuation of at least one locking device disposed at least at one remote location, said system comprising:

lock monitoring means, located at the remote location for providing a key identifying signal upon each actuation of the associated locking device, said key identifying signal being indicative of the actuating key;

first means located at the remote location and responsive to the key identifying signal, for automatically transmitting the central office a facility identifying signal indicative of the facility at which the actuated locking device is located and for automatically transmitting the key identifying signal to the central office;

second means located at the central office for receiving said key and facility identifying signals and for providing a record of said signals and the time and date of their receipt; and wherein said first means includes telephone dialing means responsive to said key identifying signal for automatically dialing the telephone number of the central office; and data transmission means for repetitively transmitting said key and facility identifying signals to the central office by means of the telephone system, said transmission commencing upon receipt of an authorizing signal from said second means and terminating upon receipt of a validity signal from said second means; and wherein said second means includes means for producing said authorization signal upon the completion of the telephone connection between said first and second means; and means for producing said validity signal after successive identical sets of said repetitively transmitted data which resulted from a given key actuation have been received.

7. The system of claim 6 wherein said second means includes means for converting said key and facility identifying signals and the time and date of their receipt into the ASKII code; and a TELETYPE printer coupled to receive said ASKII coded data.

8. The system of claim 6 wherein said second means further comprises a TELETYPE reperforator coupled to receive said ASKII coded data.

9. The system of claim 6 wherein said lock monitoring means includes:

a lock cylinder body having multiple pins associated with multiple pin positions;

a cylindrical lock plug mounted for rotation in said cylinder body and for interacting with said pins such that insertion of a key of a predetermined configuration into the keyway of said plug positions the pins so as to allow rotation of said plug with respect to said cylinder;

a plurality of cylindrical sleeves disposed between the lock cylinder body and the plug and with each sleeve having a flat surface formed thereon and an opening formed therein such that said opening is in alignment with an associated pin position in said cylinder body and in said plug when the keyway of said plug is in the nonactuated position of the plug;

a plurality of switches with each switch having an actuating plunger, said switches being mounted relative to said cylinder body such that each said plunger protrudes through an opening formed in said lock cylinder body and each said plunger is adjacent to the flat surface of an associated sleeve when said keyway is in the nonactuated position of the plug; and wherein the position of said plungers is such that said plungers are depressed except when the flat surface of said sleeve is adjacent thereto; whereby selection of the configuration of said pins and actuating keys allows selected ones of said sleeves to rotate with said plug and thereby close the associated switches.

10. A system for providing a record at a central office of the actuation of at least one remotely located locking device and the identification of the actuating key, said system comprising:

lock cylinder means, disposed at a remote location, for sensing each actuation of an associated locking device and for providing key identifying binary signals indicative of the identification of the actuating key;

first means, located at the remote location and responsive to said key identifying binary signals, for automatically transmitting to the central office facility identifying binary signals indicative of the facility at which the actuated lock is located and for automatically transmitting the key identifying binary signal to the central office, said first means including telephone dialing means responsive to said key identifying binary signals for automatically dialing the telephone number of the central office; and data transmission means responsive to a received transmit authorizing tone for transmitting said key and facility identifying binary signals to the central office by means of the telephone network; and second means located at the central office for receiving said key and facility identifying signals and for providing a record thereof, said second means including transmission authorization means for sending through the telephone network a transmit authorizing tone to said first means upon the completion of the telephone connection between said first and second means.

11. The system of claim 10 wherein said data transmission means repetitively transmits said key and facility identifying binary signals to the central office until a validity signal is received by said data transmission means; and wherein said second means includes validity determination means for comparing successive sets of received key and facility identifying signals and for sending through the telephone network a validity signal after successive sets of identical data have been received at said second means.

12. The system of claim 11 wherein said first means includes means responsive to the receipt of said validity signal for disconnecting the telephone connection between the remote location and the central telephone office.

13. A system for providing a record at a central office of the actuation of at least one remotely located locking device and the identification of the actuating key, said system comprising:

lock cylinder monitoring means, disposed at a remote location, for sensing each actuation of an associated locking device and for providing key identifying binary signals indicative of the identification of the actuating key, said lock cylinder means including a key type lock cylinder and plug arrangement, a plurality of cylindrical sleeves, and wherein the normal opening in the body of said lock cylinder adapted for receiving said plug is counter bored and said sleeves are disposed in said counter bored section between the lock cylinder body and the plug and with each sleeve having a flat surface formed therein and an opening formed therein such that said opening is in alignment with an associated pin position in said cylinder body and in said plug when the keyway of said plug is in the nonactuated position of the plug, and a plurality of switches with each switch having an actuating plunger, said switches being mounted relative to said cylinder body such that each said plunger protrudes through an opening formed in said lock cylinder body and each said plunger is adjacent to the flat surface of an associated sleeve when said keyway is in the nonactuated position of the plug; and wherein the position of said plungers is such that said plungers are depressed except when the flate surface of the associated sleeve is adjacent thereto, whereby selection of the configuration of the cylinder pins and actuating keys allows selected ones of said sleeves to rotate with said plug and thereby close selected ones of said switches;

first means, located at the remote location and responsive to said key identifying binary signals, for automatically transmitting to the central office facility identifying binary signals indicative of the facility at which the actuated lock is located and for automatically transmitting the key identifying binary signals to the central office; and second means located at the central office for receiving said key and facility identifying signals and for providing a record thereof.

14. The system of claim 13 wherein the counter bored section of said cylinder body is contiguous to the front of said cylinder body.

* * * * *